United States Patent [19]

Fenton

[11] Patent Number: 4,584,244

[45] Date of Patent: Apr. 22, 1986

[54] PREPARATION OF COLD FLOW RESISTANT POLYMER POWDERS

[75] Inventor: Jeff T. Fenton, Ponca City, Okla.

[73] Assignee: Conoco Inc., Ponca City, Okla.

[21] Appl. No.: 737,961

[22] Filed: May 28, 1985

[51] Int. Cl.$^4$ .......................... B05D 7/00; B32B 5/16; B32B 9/00; F26B 5/06
[52] U.S. Cl. .......................................... 428/407; 34/5; 51/281 R; 427/222
[58] Field of Search ....................... 34/5, 92; 427/222; 428/407; 51/281 R

[56] References Cited

U.S. PATENT DOCUMENTS 4,125,569 11/1978 Jackson .............................. 585/275

FOREIGN PATENT DOCUMENTS 131559 7/1984 Japan .................................. 427/222

Primary Examiner—Michael R. Lusignan
Attorney, Agent, or Firm—Cortlan R. Schupbach

[57] ABSTRACT

Free-flowing, reagglomeration-resistant powders are prepared utilizing finely divided polymer particles coated with alumina. The alumina-coated polymer powder exhibits cold-flow reagglomeration-resistance behavior and, when added to solvents specific for the alumina-coated polymer, dissolves very rapidly.

6 Claims, No Drawings

PREPARATION OF COLD FLOW RESISTANT POLYMER POWDERS

This invention relates to a method for preparing high molecular weight noncrystalline hydrocarbon soluble polymers as flowable powder with decreased dissolution time in solvent hydrocarbons flowing through conduits to enhance the effect of the drag-reducing polymers. More specifically, the present invention relates to specific coating materials for providing a free-flowing powder and to a method of making such materials more effective by providing such materials to solvent hydrocarbons in a more finely divided form under which dissolution and subsequent drag reduction may occur more rapidly.

Currently used drag-reduction systems utilize a process of injecting a drag-reducing polymer solution containing a high percentage by weight of polymer into conduits containing flowing solvent hydrocarbon. The material to be injected is normally extremely thick and difficult to handle at low temperatures. Depending upon the temperature of the solvent hydrocarbon and the concentration at which the drag-reducing polymer solution is injected, significant time elapses before dissolution and resulting drag reduction occurs. In addition, complex equipment for storage, dissolving, pumping, and injecting metered quantities of drag-reducing material into flowing hydrocarbons is necessary.

When in the form of a finely divided powder, the noncrystalline, high molecular weight polymers of the present invention have a severe tendency to "cold flow" and reagglomerate very rapidly even at subambient temperatures. Under conditions of pressure, such as stacking or palleting, cold flow is even more intense and reagglomeration occurs very quickly.

Highly effective drag-reducing polymers are described in the art. Representative, but nonexhaustive, samples of such art are U.S. Pat. No. 3,692,675 which teaches a method for reducing friction loss or drag for pumpable fluids through pipelines by adding a minor amount of a high molecular weight noncrystalline polymer. U.S. Pat. No. 3,884,252 teaches the use of polymer crumb as a drag-reducing material. These materials are extremely viscoelastic, are not suitable for forming injection-molding articles and, in general, have no known use other than as drag-reducing materials. However, the very properties that make these materials extremely effective as drag-reducing additives make them extremely difficult to handle since they have a severe tendency to cold flow and reagglomerate.

The general propensity of noncrosslinked polymeric material to cold flow and agglomerate is well-known. Polymeric materials of this sort cannot be pelletized or put into discrete form and then stored for any reasonable period of time without the materials flowing together to form large agglomerates. Because of such difficulties, elastomers are normally shipped and used as bales of rubber. However, such bales must be handled on expensive equipment and cannot be preblended. In addition, polymers such as the drag-reducing additives described are not susceptible to such balings, since cold flow is extremely severe. Further, dissolution time for such drag-reducing materials from a polymer state in the flowing hydrocarbons to a dissolved state is so lengthy as to severely reduce the effectiveness of this material as a drag-reducing substance.

Numerous attempts have been made to overcome the disadvantages inherent in cold-flowing polymers. Representative, but nonexhaustive, of such art is that described in U.S. Pat. No. 3,791,913, wherein elastomeric pellets are surface cured, i.e., vulcanized to a minor depth in order to maintain the unvulcanized interior of the polymer in a "sack" of cured material. U.S. Pat. No. 4,147,677 describes a method of preparing a free-flowing, finely divided powder of neutralized sulfonated elastomer by admixing with fillers and oils. This reference does not teach a method for making free-flowing powders of nonelastomeric material. U.S. Pat. No. 3,736,288 teaches solutions of drag-reducing polymers in inert, normally liquid vehicles for addition to liquids flowing in conduits. A "staggered dissolution" effect is provided by varying the size of the polymer particles. Suspending or surface-active agents can also be used. While directed to ethylene oxide polymers, the method is useful for hydrocarbon-soluble polymers as well. U.S. Pat. No. 4,088,622 describes a method of making an improved molded drag-reducing coating by incorporating antioxidants, lubricants and plasticizers and wetting agents in the form of a coating which is bonded directly onto the surface of materials passing through a liquid medium. U.S. Pat. No. 4,340,076 teaches a process for dissolving high molecular weight hydrocarbon polymer and liquid hydrocarbons by chilling to cryogenic temperatures comminuting the polymer formed into discrete particles and contacting these materials at near cryogenic temperatures with the liquid hydrocarbons to more rapidly dissolve the polymer. U.S. Pat. No. 4,341,078 immobilizes toxic liquids within a container by injecting a slurry of cryogenically ground polymer particles while still at cryogenic temperatures into the toxic liquid. U.S. Pat. No. 4,420,440 teaches a method for collecting spilled hydrocarbons by dissolving sufficient polymer to form a nonflowing material of semi-solid consistency by contacting said hydrocarbons with a slurry of cryogenically comminuted ground polymer particles while still at cryogenic temperatures.

The use of ultrahigh molecular weight polymers continues to increase. Applications such as drag reducers for pipelines carrying fluids under turbulent flow conditions increase as energy demand increases and power costs increase. Drag reduction is a phenomena known to depend upon the high molecular weight of the polymer additive and its ability to dissolve in the hydrocarbon under turbulent flow.

Other applications for such ultrahigh molecular weight polymers includes as antimisting additives for aviation fuel. Such polymers have been found to reduce the tendency of jet fuels to atomize upon collision, thus making impact-survivable airplane crashes safer from fuel fires.

One drawback to the use of such ultrahigh molecular weight polymers is their very slow dissolution. Solid polymers of these types can take days to dissolve in some cases, even though drag reduction is greatly enhanced once dissolution has occurred. This problem can be overcome by using polymer solutions of predissolved polymer. However, such ultrahigh molecular weight polymer solutions become very viscous as polymer content increases, thus limiting the practical application of these solutions to those containing no more than about 15 weight percent polymer. Additionally, even in this predissolved state, complete polymer dissolution can be very slow.

It would therefore be of great benefit to provide a method for placing ultrahigh molecular weight noncrystalline polymers with an extreme tendency to cold-flow and reagglomerate into a form which is easily handled, yet provides rapid dissolution and subsequent drag reduction.

I have now discovered that grinding such ultrahigh molecular weight noncrystalline polymers at cryogenic temperatures yields a finely divided polymer which, when coated with alumina, and preferably when ground at cryogenic temperatures in the presence of alumina, the resultant alumina-coated discrete particles do not reagglomerate, even under cold-flow conditions, in contrast to results obtained with other common fillers such as talc and the like, which allow reagglomeration even under mild compression.

In the present invention, high molecular weight, noncrystalline polymers are ground at cryogenic temperatures, i.e., temperatures below the glass transition temperature of the polymer or polymer blends. For example, for high molecular weight poly(1-decene), such cryogenic temperature is below about $-60°$ C. This temperature can vary depending upon the glass transition point of the particular polymer or polymer blend, but normally such temperatures must be below the lowest glass transition point of a polymer which comprises a polymer blend.

I have now discovered that a free-flowing polymer slurry can be prepared by grinding such high molecular weight noncrystalline polymers at cryogenic temperatures to a desired particle size. This method is particularly useful for polymers of ultrahigh molecular weight which are noncrystalline and capable of reducing drag in hydrocarbons flowing through conduits.

In a preferred embodiment of the present invention, such high molecular weight noncrystalline polymers are ground in the presence of alumina to provide a finely divided flowing powder which is uniquely resistant to reagglomeration under cold-flow or compressive conditions. This result is extremely surprising since other common coatings such as talc are ineffective in preventing reagglomeration under compression. The specific properties of alumina which impart this nonagglomeration tendency to the polymer are not known.

The term "alumina" as used herein refers to an apparently dry solid which may contain, in addition to $Al_2O_3$, free water, water of hydration, trace amounts of other materials, and the like. In the present invention, colloidal alumina can be used, but suspending materials necessary to maintain alumina in a colloidal form must usually be removed from the coated particles before a free-flowing powder will result. Aluminas from bauxite or from the hydrolysis of aluminum alkoxides are preferred, while alumina from the hydrolysis of aluminum alkoxides are most preferred.

The high molecular weight noncrystalline hydrocarbons most advantageously used in the present invention are those known in the art for reducing drag in hydrocarbons flowing through conduits.

Representative materials are available commercially under the trademark CDR 102 (trademark of and sold by Conoco Inc.). These materials are high molecular weight polymers and copolymers prepared from monomers containing from about 2 to about 20 carbon atoms which are polymerized to extremely high molecular weight, said polymers represented by polyoctene, polydecene, polydodecene, and the like.

In a preferred embodiment of the instant invention, the high molecular weight noncrystalline polymer is cooled to a point below the glass transition point and ground into finely discrete particles. Particle size can be controlled by methods known in the art, such as grinding speed. While at this low temperature, alumina is added to the grinding which is continued for a brief time in order to completely coat the discrete particles. Preferably, alumina is added to the polymer at the desired concentration and the combined alumina polymer mixture is ground at cryogenic temperatures. The art teaches that many coating materials can be used, so long as such materials are compatible with the final use for which the coated polymer is intended. Representative, but nonexhaustive, examples of such materials are talc, alumina, magnesium stearate, silica gel, polyanhydride polymers, and sterically hindered alkyl phenol antioxidants.

However, it has been surprisingly found that only alumina allows the retention of discrete polymer particles under cold-flow and compressive flow conditions at ambient temperatures. This is distinctly surprising since alumina is not taught in the art to be an especially useful coating material for any polymer, yet alumina exhibits surprising ability to maintain discrete particles under such cold-flow and compressive conditions, in contrast to the more commonly used talc and clays.

Grinding temperatures for the instant invention are not critical other than it be carried out at a temperature below the glass transition point of the polymers being ground. Lower temperatures can be used.

The instant invention is more concretely described with reference to the examples below wherein all parts and percentages are by weight unless otherwise specified. The examples are provided to illustrate the present invention and not to limit it.

EXAMPLE 1

As an illustrative example, poly(1-decene) was ground without talc. Approximately 1 gram of amorphous solid poly(1-decene) having an inherent viscosity of at least 9 dl/g (measured at 25° C. in a hydrocarbon solvent) was placed in a freezer mill (SPECS freezer mill, made by Specs Industries Inc. Metuchen, N.J.) and frozen with liquid nitrogen. The sample was ground for 3 minutes after which it was removed from the sample holder. The polymer came out of the grinder as a finely pulverized powder, which within seconds, began to swell and became very tacky. Within minutes, the powder had become a single spongy polymer mass similar to that before grinding.

EXAMPLE 2

Example 1 was followed to prepare a ground polymer particle except that in addition to the polymer, one-half of the desired weight of talc was placed in the mill followed by the entire weight of the poly-1-decene. The other ½ half of the talc was then added on top of the poly-1-decene and the mixture frozen for three minutes in a liquid nitrogen bath. The frozen mixture was then ground for three minutes. Removal of the system from the grinder yielded a finely divided powdery product which showed no tendency to reswell and become tacky. These powders remain free-flowing for several weeks if not subjected to compressive forces. Powders containing 16.5, 22.9, and 25.0 weight percent talc were prepared. All showed excellent solubility when added to organic solvents. Solubility time is less than two minutes instead of several hours.

EXAMPLE 3

Example 2 was repeated utilizing different inert solids in order to determine their effect in the cryogrinding of poly(1-decene). All tests were carried substantially as described in Example 2. Results were set forth in Table 1 wherein the symbol "+" shows that the powder does not reagglomerate while the symbol "−" shows a rubbery mass resulted after warming. The table shows that both inorganic and organic solids can be used as coating and prevent polymer reagglomeration by coating mechanism wherein small particle size makes coating easier and apparently more effective. In the table results, the notation "+" indicates that the solid remains nontacky, while the notation "−" indicates the resultant powder reagglomerated. The alumina used was DeGussa C alumina, trademark of and sold by DeGussa Chemical Company.

TABLE 1

INERT SOLIDS EVALUATED IN CRYOGRINDING OF POLY(1-DECENE)

| Inert Solids | Polymer Weight % | Grinding Wt. % | Time | Results |
|---|---|---|---|---|
| Talc | 16.5 | 83.5 | 3 minutes | + |
| Talc | 22.9 | 77.1 | 3 minutes | + |
| Talc | 25.0 | 75.0 | 3 minutes | + |
| Talc | 50.0 | 50.0 | 3 minutes | + |
| Activated Charcoal | 25.0 | 75.0 | 3 minutes | − |
| PVC (powder) | 25.0 | 75.0 | 3 minutes | − |
| HDPE (powder) | 25.0 | 75.0 | 3 minutes | − |
| 2,6 di-butyl-p-cresol | 25.0 | 75.0 | 3 minutes | + |
| Alumina | 25.0 | 75.0 | 3 minutes | + |
| Alumina | 50.0 | 50.0 | 3 minutes | + |
| Magnesium Stearate | 25.0 | 50.0 | 3 minutes | + |
| Silica Gel (PQ Corp., Microspherical) | 25.00 | 50.00 | 3 minutes | + |
| Copolymer[1] | 25.00 | 75.00 | 3 minutes | + |
| Copolymer[1] | 50.0 | 50.0 | 3 minutes | + |

[1] A copolymer of maleic anhydride and octadecene, trademark of and sold by Gulf Chemical Company, sold as PA-18.

The inert solids set forth in Table 1 placed under compressive force of 10,000 psi and observed. After a period of 1 minute compression, all free-flowing polymers reagglomerated into a solid mass with the exception of alumina which remained a friable powder which upon a rubbing action easily returned to a free-flowing powder. The remaining materials remained as solid agglomerated masses.

While certain embodiments and details have been shown for the purpose of illustrating this invention, it will be apparent to those skilled in this art that various changes and modifications may be made herein without departing from the spirit or scope of the invention.

I claim:

1. A method for the preparation of highly reagglomeration-resistant, free-flowing solid polymer particles, comprising grinding said polymer to a desired size and coating the polymer particles with alumina.

2. A method as described in claim 1 wherein the polymer grinding is carried out in the presence of alumina.

3. A method as described in claim 2 wherein the grinding is carried out at a cryogenic temperature below glass transition temperature of the polymer.

4. A method as described in claim 3 wherein the polymer is an ultrahigh molecular weight, noncrystalline polymer capable of reducing drag in hydrocarbons flowing through conduits, where such hydrocarbons are solvents with respect to the polymer.

5. Free-flowing, reagglomeration-resistant solid polymer particles coated with alumina which remain friable and free-flowing after being subjected to a compressive force of 10,000 pounds per square inch for a time of one minute.

6. The coated polymer particles of claim 5 wherein the polymer is an ultrahigh molecular weight, noncrystalline polymer capable of imparting drag reduction to hydrocarbons flowing through conduits, where such hydrocarbons are solvents with respect to the polymer.

* * * * *

UNITED STATES PATENT OFFICE
CERTIFICATE OF CORRECTION

PATENT NO. : 4,584,244
DATED : April 22, 1986
INVENTOR(S) : Jeff T. Fenton

It is certified that error appears in the above-identified patent and that said Letters Patent are hereby corrected as shown below:

Column 2, line 35, "4,420,440" should read --4,420,400--.

Signed and Sealed this

Fifteenth Day of July 1986

[SEAL]

Attest:

DONALD J. QUIGG

Attesting Officer

Commissioner of Patents and Trademarks